Dec. 17, 1963  R. N. LEVINN  3,114,812
DUAL ACTION THERMOSTAT HAVING PLURAL ADJUSTMENT MEANS
Filed June 12, 1962
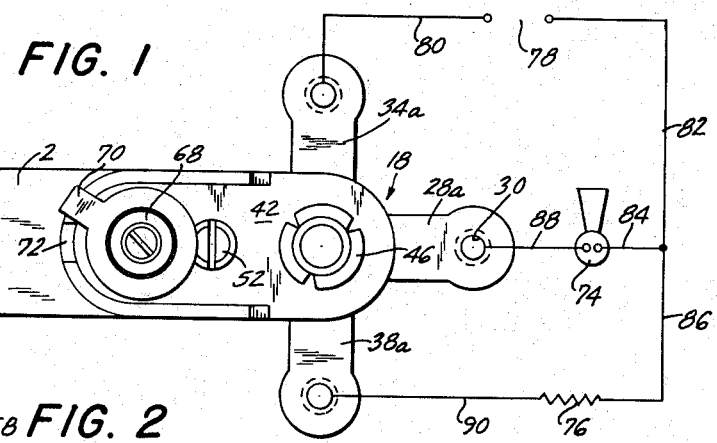
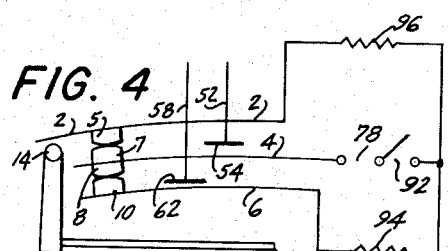
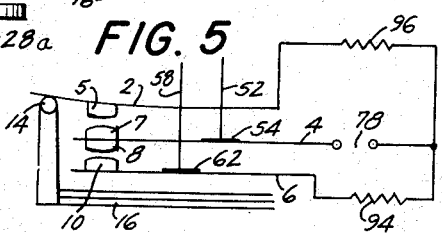
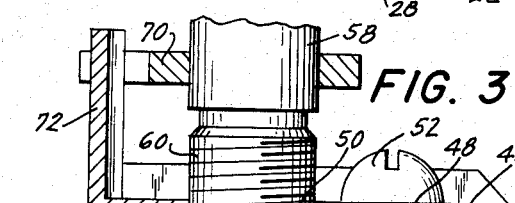
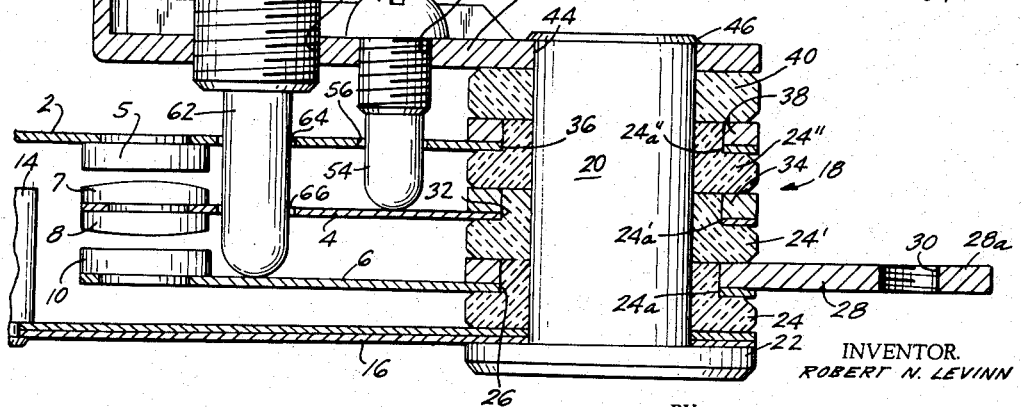
INVENTOR.
ROBERT N. LEVINN
BY *James and Franklin*
ATTORNEYS

United States Patent Office 3,114,812
Patented Dec. 17, 1963

3,114,812
DUAL ACTION THERMOSTAT HAVING PLURAL ADJUSTMENT MEANS
Robert N. Levinn, Catskill, N.Y., assignor to American Thermostat Corporation, South Cairo, N.Y., a corporation of New York
Filed June 12, 1962, Ser. No. 201,917
22 Claims. (Cl. 200—138)

The present invention relates to a unitary thermostat construction capable of performing a plurality of control functions.

The usual thermostatic switch comprises a pair of switch arms movable into and out of engagement with one another, their relative position being controlled in part by an adjustable means active on a first of the arms and in part by a temperature sensing element such as a bendable bimetal strip active on the second of the arms. The bimetal strip tends to move the second arm away from the first arm, the first arm being prevented from following that second arm by the setting of the adjustable means, thus controlling the temperature at which the device operates to make and break the circuit being controlled.

In certain applications more than one circuit must be controlled, the control of the two circuits being related to one another in accordance with the desired mode of operation of the apparatus being controlled. It is for such situations that the instant invention has been devised. In some such applications both of the external electrical circuits are to be controlled thermostatically, but with the control effective at different temperatures. In other instances only one of the external circuits is to be thermostatically controlled, the status of the other circuit being interlocked with the status of the thermostatically controlled circuit in some desired way.

In order to provide for sophisticated control of the nature required in applications of these types, in the past a plurality of individual control elements, thermostatic or manual as required, had to be employed, with more or less complicated circuitry or interconnecting mechanical elements being employed to provide for the desired functional relationship between the control of the two circuits. This made for expense and for unreliability, and it also involved adding to the weight and bulk of the control equipment. The significance of the factors of expense and reliability is obvious; factors of weight and volume are of particular significance in hand-held or portable equipment, such as hand manipulated hair driers.

It is the prime object of the present invention to provide a single unitary assembly, formed of standard-type elements which are completely or substantially completely or substantially completely conventional in nature and construction, said assembly being capable of achieving independent but related control of a plurality of external circuits. It is a further prime object of the present invention to devise a basic construction which, through simple adjustment and modification, where necessary, can be adapted to perform a wide variety of different control functions.

In the case of a hand-held hair drier, two work devices are employed. A blower is used to blow air through the device and a heater is used to heat the air. Sometimes the user wishes to blow unheated air on her hair. When the heater is to be used it should not overheat the air, and the temperature to which the air is heated should be adjustable and under the control of the user. Whenever the heater is energized the blower should be on, for safety reasons. To provide the requisite control of both the heater and the blower, the heater being thermostatically controlled, the blower being energized whenever the heater is energized, and the blower being energizable when the heater is not energized, has in the past required the use of a plurality of control devices, and has required fairly complicated manipulation on the part of the user. In accordance with the present invention, however, the device may be provided with a single control element adapted to be actuated by the user, that element being movable from an "off" position to a "blower-on" position and then to a series of positions controlling the temperature at which the heater will be energized, no matter what the ambient temperature may be (within normal limits of variation). When the control element is in its "blower-on" position only the blower is turned on, and the heater remains off. As the control element is further rotated the heater is energized and thermostatic control thereover is accomplished at whatever temperature is selected by the user, the blower remaining on all the time that the heater is under thermostatic control.

In a different installation it may be desired to utilize different work devices, such as a low capacity heater and a high capacity heater, only the high capacity heater being thermostatically controlled and the low capacity heater being manually controlled, and turned on at all times that the high capacity heater is turned on. It may be desired that all of the heaters be positively turned off when the manual switch is moved to its "off" position or it may be desired that one of the heaters should come on again if the ambient temperature should fall below a given value. A pair of heaters may be employed, each to be thermostatically controlled but at different temperatures. The work devices could be cooling assemblies, one to be turned on if the temperature rises above a given value and the other to be turned on in addition if the temperature continues to rise. These are but typical of a wide variety of complicated control problems which can be efficiently and effectively carried out by the structure of the present invention.

In accordance with the present invention I provide a plurality of contact-carrying arms which are relatively movable so that the separate contact pairs carried thereby may be moved into or out of engagement with one another, thereby to make or break the individual electrical circuits in which they are connected. The contact pair on the first and second arms is connected in one electrical circuit and the contact pair on the second and third arms is connected in another electrical circuit. The position of the first arm is controlled in part by a temperature sensing device such as a bimetal strip and the positions of the second and third arms are controlled in part by adjustable elements mounted on the support for the assembly. These adjustable elements are independently set or adjusted so as to provide for the desired relationship in movement and position of the spring arms, and at least one of them (and preferably only one of them) is made manually accessible to the user of the device. By suitably selecting contact arms and bimetallic strips having desired movement characteristics, and by judicious presetting of the adjustment elements, a plurality of electrical circuits may be independently controlled in a variety of manners, as desired.

To the accomplishment of the above, and to such other objects as may hereinafter appear, the present invention relates to the construction and operative action of a dual action thermostat assembly as defined in the appended claims and as described in this specification, taken together with the accompanying drawings, in which:

FIG. 1 is a top plan view of a typical embodiment of the present invention, together with a schematic drawing showing one specific pair of circuits adapted to be controlled thereby;

FIG. 2 is a side elevational view of the thermostat assembly;

FIG. 3 is a cross sectional view thereof, on an enlarged scale; and

FIGS. 4 and 5 are schematic circuit diagrams illustrating different ways in which the basic device of the present invention can be used.

In the form here specifically disclosed the circuit-making and -breaking operative parts of the thermostat comprises first, second and third arms 2, 4 and 6 respectively positioned one above the other in that order, the arm 2 carrying a downwardly facing contact 5, the arm 4 carrying an upwardly facing contact 7 and a downwardly facing contact 8, and the arm 6 carrying an upwardly facing contact 10, the contacts 5 and 7 being opposed to one another and defining a first engageable and disengageable contact pair, the contacts 8 and 10 being opposed and defining a second engageable and disengageable contact pair. The arm 2 extends out beyond the arms 4 and 6, and its outwardly extending portion is adapted to be engaged by an insulating part 14 carried by bimetallic strip 16. As is relatively conventional, corresponding ends of the arms 2, 4 and 6 and the bimetallic strip 16 are mounted in a stack generally designated 18. The mounting end of the bimetallic strip 16 is received over the shank 20 of a securing rivet and is clamped between the head 22 of that rivet and a heat- and electrical-insulating washer 24. The lower arm 6 is provided with an aperture 26 within which a central upwardly projecting portion 24a of the washer 24 is received. A rigid conductive terminal strip 28 is received thereover in electrical contact with the arm 6, the terminal portion 28a of the strip 28 extending out longitudinally of the stack 18 and being provided with an aperture 30 into which a lead is adapted to be received. Another insulating washer 24' is received on the rivet shank 2 above the strip 28. The arm 4 is provided with an opening 32 in which the upwardly projecting portion 24a' of the washer 24' is received, and a conductive terminal strip 34 is positioned thereabove and in electrical contact therewith, the terminal portion 34a thereof extending out to one side of the stack 18. Another insulating washer 24" is positioned above the terminal strip 34, and the arm 2 is provided with an opening 36 in which the upwardly projecting portion 24a" of the washer 24" is received, a conductive terminal strip 38 being positioned thereabove and in electrical contact therewith, the terminal portion 38a thereof extending out to the other side of the stack 18. An insulating washer 40 is positioned on top of the terminal strip 38. A support arm 42 is positioned on top of the washer 40 and is provided with an opening 44 through which the rivet shank 20 extends, the tip of the rivet being headed over at 46 on top of the support arm 42 so as to retain the stack 18 in clamped assembled position.

The support arm 42 extends over the arm 2 and is provided with a pair of internally threaded openings 48 and 50. An adjusting screw 52 is threadedly received in the opening 48 and is provided with an insulating depending portion 54 which extends freely through an opening 56 in the arm 2 and engages the upper surface of arm 4. A manual adjustment shaft 58 has an externally threaded portion 60 which is threadedly received in the opening 50, and an insulating part 62 extends down therefrom and passes freely through openings 64 and 66 formed in the arms 2 and 4 respectively and engages the upper surface of arm 6. The adjustment shaft 58 has an upper knurled portion 68 which is adapted to extend out through the housing (not shown) which encloses the thermostat assembly, and to which a manual adjustment knob (not shown) is adapted to be secured. A stop 70 is fast on the shaft 58 and is adapted to cooperate with a post 72 extending up from the support arm 42 so as to limit the rotative movement of the shaft 58. The adjusting screw 52 is preferably received within the housing (not shown), and is pre-set upon assembly of the device.

FIG. 1 discloses the apparatus connected in a circuit adapted to control the energization of a blower 74 and a heater 76, such as might be employed in a hair drier. One side of an external source of power 78 is connected via lead 80 to the terminal strip 34. The other side of the power source 78 is connected via leads 82 and 84 to one side of the blower 74, and via leads 82 and 86 to one side of the heater 76. The other side of the blower 74 is connected via lead 88 to the terminal strip 28, while the other side of the heater 76 is connected via lead 90 to the terminal strip 38. The arm 2 is inherently spring biased downwardly, while the arms 4 and 6 are inherently spring biased upwardly. Normal upward movement of the arm 4 is limited by its engagement with the part 54, the vertical position of which is adjusted by means of the screw 52. The upward movement of the arm 6 is limited by engagement with the part 62, the position of which is controlled through rotative movement of the shaft 58. The resilient force of the arm 6 is greater than that of the arm 4, so that the arm 6 can move the contact-carrying portion of the arm 4 upwardly even after the arm 4 has engaged with its stop 54. The bimetal strip 16 is adapted to bend upwardly with increase in temperature, and assumes a nominal position (at normal room temperature) such as is shown in FIG. 2, where it engages the outwardly extending end of the arm 2 and prevents that arm from moving further downwardly. The parts as shown in FIG. 2 correspond to the "off" position of the system, with the control shaft 58 screwed all the way downwardly. In this position both the blower 74 and heater 76 are positively de-energized, the adjustable member 54 ensuring that the contact 7 is separated from the contact 5 and the adjustable member 62 ensuring that the contact 10 is separated from the contact 8.

If now the operator desires to turn on only the blower she will rotate the shaft 58 an appropriate amount, as indicated by a suitable index plate on the housing, so as to lift the member 62 and thus permit the arm 6 to rise until contact 10 engages contact 8. This will close the circuit through the blower 74, but since the contacts 5 and 7 are still separated, there will be no circuit completed through the heater 76. If the heater 76 is to be turned on the shaft 58 will be further rotated, further lifting the part 62 and permitting the arm 6 to move upwardly, pushing the outwardly extending portion of the arm 4 along with it, until the contacts 5 and 7 engage, thus closing the circuit through the heater 76 and energizing that heater. The shaft 58 will be further rotated, causing the arm 6 to move the arms 4 and 2 upwardly until the arm 2 has been lifted from the part 14 carried by the bimetal strip 16, the degree to which it is thus lifted determining the temperature at which thermostatic control will be effected. This temperature may be indicated, as is conventional, by means of a series of graduations on the thermostat housing cooperable with an index pointer carried by the knob adapted to be attached to the shaft 58. As the temperature rises the bimetal strip 16 will bend upwardly, and at an appropriate temperature the part 14 will lift the arm 2 from the arm 4, separating the contacts 5 and 7 and opening the circuit through the heater 76. The contacts 8 and 10 will remain in engagement, however, and the blower 74 will remain energized.

The arrangement disclosed, it will be apparent, provides a positive "off" for the system, permits the user to energize the blower 74 independently of the heater 76, provides for adjustable thermostatic control of the heater 76, and ensures that whenever the heater 76 is energized the blower 74 will also be energized.

The two work devices controlled respectively by the contacts 8 and 10 and by the contacts 5 and 7 could, of course, take a wide variety of forms. Thus the work device controlled by contacts 8 and 10 could be a low capacity or "keep warm" heater, while the contacts 5 and 7 could control the operation of a high capacity heater. Moreover, through appropriate positioning of the part 54 which controls the nominal position of the arm 4, a situation could be produced in which, if the ambient temperature fell below a given value, thus causing the bimetal strip 16 to bend down below its nominal position shown in the drawing, the contact 5 could be brought into engagement with contact 7, thus energizing the heater 76 or other work device.

FIG. 4 illustrates another arrangement of substantially the same parts to produce a different type of control. Here the arm 2 is strong enough to move both the arms 4 and 6 away from their respective adjustable stops 54 and 62, the nominal position of the part 14 carried by the bimetal strip 16 is spaced downwardly from the end of the arm 2, and the adjustable means 62 engages arm 6 and prevents further upward movement thereof before adjustable means 54 engages arm 4 and prevents its further upward movement. In this embodiment a separate on-off switch 92 is placed in series with the power source 78, that power source 78 being connected to the intermediate arm 4, while work devices 94 and 96, such as heaters, are connected respectively to the lower arm 6 and the upper arm 2. When the switch 92 is closed both heaters 94 and 96 are energized. As the temperature rises the bimetal strip 16 bends upwardly and lifts the arm 2, the arms 4 and 6 following along. The stop member 62 then engages the arm 6 and prevents it from moving upwardly further. Arms 2 and 4 continue to move upwardly as the temperature rises, thus separating contacts 8 and 10 and deenergizing heater 94. Heater 96 remains energized until the arm 4 reaches and engages its stop member 54, after which thermostatic control of the heater 96 is effectuated at the temperature corresponding to the setting of the strip 54. Thus, with a single bimetallic strip 16, control of the energization of heaters 94 and 96 is effectuated at different temperatures, each of those temperatures being adjustable through the setting of the appropriate stop member 62 or 54.

The embodiment of FIG. 5 is similar to the embodiment of FIG. 4, except that no on-off switch 92 is employed, the nominal position of the part 14 carried by the bimetal strip 16 is such, when the strip 16 is in its nominal position, as to lift the arm 2 and permit each of the arms 4 and 6 to engage with their respective stop members 54 and 62, and the bimetal strip 16 is designed to bend downwardly when cooled. As the temperature drops the arm 2 will move down until the contacts 5 and 7 engage, energizing heater 96. If that heater provides sufficient heat to maintain the temperature at a desired value, the heater 94 will never be energized. On the other hand, if the temperature should drop further, the arm 2 will move the arm 4 down, keeping the heater 96 energized, until contacts 8 and 10 engage, thus energizing the additional heater 94, then providing thermostatic control of the heater 94 at a somewhat lower temperature than that provided for the heater 96 alone.

The illustrated systems are but typical of many in which the assembly of the present invention may be utilized, and are believed to illustrate the high degree of control adaptability which is characteristic of the structure of the present invention. It is significant that this high degree of control flexibility is achieved by means of an assembly which takes up practically the same amount of space as a conventional single control unit and which is composed of parts either closely or exactly similar to parts employed in conventional single control units. Thus manufacture and assembly is facilitated, weight, size and expense are minimized, but adaptability is greatly extended and control operations may be carried out simply and reliably in applications which formerly have defined control except by very complex apparatus.

While but a limited number of embodiments of the present invention have been here specifically disclosed, it will be apparent that many variations may be made therein, all within the scope of the instant invention as defined in the following claims.

I claim:

1. A dual control thermostat comprising a support, first and second arms mounted thereon for movement toward and away from one another and carrying opposed engageable and disengageable contacts, a third arm mounted on said support for movement toward and away from said second arm, said second and third arms carrying opposed engageable and disengageable contacts, first adjustable means normally operatively engaged with said third arm and effective when thus engaged to at least in part control its position toward and away from said second arm, second adjustable means operatively connected to said second arm and effective to at least in part control its position toward and away from said first arm, said third arm being effective, when engaged with said second arm, to move said second arm toward and away from said first arm independently of the action of said second adjustable means, temperature sensing means active on said first arm and effective to at least in part control its position toward and away from said second arm in accordance with changes in sensed temperature, and means electrically connected to said contacts and comprising first and second circuit sections adapted to be individually actuated in accordance with the relative positions of (a) said cooperating contacts on said first and second arms, and (b) said said cooperating contacts on said second and third arms, respectively.

2. The thermostat of claim 1, in which said second arm is located between said first and third arms.

3. The thermostat of claim 1, in which said second arm is located between said first and third arms, said first arm is biased toward said second and third arms, said first adjustable means is effective, within its range of adjustment, to move said third arm in a given direction sequentially into engagement with said second arm and to then move said second and third arms together until said second arm engages said first arm and moves said first arm away from said temperature sensing means in said given direction, and said temperature sensing means, upon change in temperature in a given sense, moves in said given direction to engage said first arm and move it away from said second arm.

4. The thermostat of claim 1, in which said first and second adjustable means are mounted on said support above said arms, one of said adjustable means engaging only the lowest of said arms, the other of said adjustable means engaging only the intermediate one of said arms.

5. The thermostat of claim 4, in which said first arm is biased toward said second and third arms, said first adjustable means is effective within its range of adjustment to move said third arm in a given direction sequentially into engagement with said second arm and then to move said second and third arms together until said second arm engages said first arm and moves said first arm away from said temperature sensing means in said given direction, and said temperature sensing means, upon change in temperature in a given sense, moves in said given direction to engage said first arm and move it away from said second arm.

6. The thermostat of claim 1, in which said first, second and third arms are mounted one above the other and said first and second adjustable means are mounted on said support above said arms, one of said adjustable means engaging only the lowest of said arms, the other of said adjustable means engaging only the intermediate one of said arms.

7. The thermostat of claim 6, in which said first arm is biased toward said second and third arms, said first adjustable means is effective within its range of adjustment to move said third arm in a given direction sequentially into engagement with said second arm and then to move said second and third arms together until said second arm engages said first arm and moves said first arm away from said temperature sensing means in said given direction, and said temperature sensing means, upon change in temperature in a given sense, moves in said given direction to engage said thus positioned first arm and move it away from said second arm.

8. The thermostat of claim 1, in which said first, second and third arms are mounted one above the other sequentially and said first and second adjustable means are mounted on said support above said arms, said first adjustable means engaging only said third arm, said second adjustable means engaging only said second arm.

9. The thermostat of claim 8, in which said first arm is biased toward said second and third arms, said first adjustable means is effective within its range of adjustment to move said third arm in a given direction sequentially into engagement with said second arm and then to move said second and third arms together until said second arm engages said first arm and moves said first arm away from said temperature sensing means in said given direction, and said temperature sensing means, upon change in temperature in a given sense, moves in said given direction to engage said thus positioned first arm and move it away from said second arm.

10. A dual control thermostat comprising a support; first, second and third resilient arms mounted on said support one above the other sequentially and electrically insulated from one another; mutually engageable and disengageable contact means on (a) said first and second arms and (b) said second and third arms respectively, said contact means being remote from the mounting points of said arms on said support; a first adjustable means mounted on said support and normally operatively engaged with and active only on said third arm so as to at least in part control its position toward and away from said first arm; a second adjustable means mounted on said support part and active only on said second arm so as to at least in part control its position toward and away from said first arm; said third arm, when engaged with said second arm, being effective to move said second arm along with itself toward said first arm; temperature sensing means active on said first arm to at least in part control its position relative to said second arm to cause said first arm to move toward and away from said second arm in accordance with changes in sensed temperature, and circuit means electrically connected to said contacts and comprising first and second circuit parts adapted to be individually actuated in accordance with the respective relative positions of (a) said cooperating contacts on said first and second arms and (b) said cooperating contacts on said second and third arms.

11. The thermostat of claim 10, in which said first arm is resiliently biased toward said second arm and said temperature sensing means, said second arm is biased toward said first arm and said second adjustable means, said third arm is biased toward said second arm and said first adjustable means, said first and second arms are movable away from said second arm and said second adjustable means respectively, and said first adjustable means is effective, via said third and second arms, to move said first arm from said temperature sensing means.

12. The thermostat of claim 10, in which said first arm is resiliently biased toward said second arm and said temperature sensing means, said second arm is biased toward said first arm and said second adjustable means, said third arm is biased toward said second arm and said first adjustable means, said first, second and third arms are movable away from said second arm, said second adjustable means and said first adjustable means respectively, and said first arm is effective, via said second arm, to move said third arm from said first adjustable means.

13. A dual control thermostat comprising a support; first, second and third resilient arms mounted on said support one above the other sequentially and electrically insulated from one another; mutually engageable and disengageable contact means on (a) said first and second arms and (b) said second and third arms respectively, said contact means being remote from the mounting points of said arms on said support; a first adjustable means mounted on said support part and normally operatively engaged with and active only on said third arm so as to at least in part control its position toward and away from said first arm; a second adjustable means mounted on said support part and active only on said second arm so as to at least in part control its position toward and away from said first arm; at least said second adjustable means engaging its respective arm between said mounting point for said arm and the contact means carried by said arm; said third arm, when engaged with said second arm, being effective to move said second arm along with itself toward said first arm; temperature sensing means active on said first arm to at least in part control its position relative to said second arm to cause said first arm to move toward and away from said second arm in accordance with changes in sensed temperature, and circuit means electrically connected to said contacts and comprising first and second circuit parts adapted to be individually actuated in accordance with the respective relative positions of (a) said cooperating contacts on said first and second arms and (b) said cooperating contacts on said second and third arms.

14. The thermostat of claim 13, in which said first arm is resiliently biased toward said second arm and said temperature sensing means, said second arm is biased toward said first arm and said second adjustable means, said third arm is biased toward said second arm and said first adjustable means, said first and second arms are movable away from said second arm and said second adjustable means respectively, and said first adjustable means is effective, via said third and second arms, to move said first arm from said temperature sensing means.

15. The thermostat of claim 13, in which said first arm is resiliently biased toward said second arm and said temperature sensing means, said second arm is biased toward said first arm and said second adjustable means, said third arm is biased toward said second arm and said first adjustable means, said first, second and third arms are movable away from said second arm, said second adjustable means and said first adjustable means respectively, and said first arm is effective, via said second arm, to move said third arm from said first adjustable means.

16. A dual control thermostat comprising a support; first, second and third resilient arms mounted on said support one above the other sequentially and electrically insulated from one another; mutually engageable and disengageable contact means on (a) said first and second arms and (b) said second and third arms respectively, said contact means being remote from the mounting points of said arms on said support; a first adjustable means mounted on said support part and active only on said third arm so as to at least in part control its position toward and away from said first arm; a second adjustable means mounted on said support part and active only on said second arm so as to at least in part control its position toward and away from said first arm; each of said adjustable means engaging their respective arms at different distances from the mounting points of said arms respectively and at least said second adjustable means engaging its arm between said mounting point for said arm and the contact means carried by said arm; said third arm, when engaged with said second arm, being effective to move said second arm along with itself toward said first arm; temperature sensing means active on said first arm to at least in part control its position relative to said second arm to cause said first arm to move toward and away from said second arm in accordance with changes in sensed temperature, and circuit means electrically connected to said contacts and comprising first and second circuit parts adapted to be individually actuated in accordance with the respective relative positions of (a) said cooperating contacts on said first and second arms and (b) said cooperating contacts on said second and third arms.

17. The thermostat of claim 16, in which said first arm is resiliently biased toward said second arm and said temperature sensing means, said second arm is biased toward said first arm and said second adjustable means, said third arm is biased toward said second arm and said first adjustable means, said first and second arms are movable away from said second arm and said second adjustable means respectively, and said first adjustable means is effective, via said third and second arms, to move said first arm from said temperature sensing means.

18. The thermostat of claim 16, in which said first arm is resiliently biased toward said second arm and said temperature sensing means, said second arm is biased toward said first arm and said second adjustable means, said third arm is biased toward said second arm and said first adjustable means, said first, second and third arms are movable away from said second arm, said second adjustable means and said first adjustable means respectively, and said first arm is effective via said second arm, to move said third arm from said first adjustable means.

19. A dual control thermostat comprising a support, first and second arms mounted thereon for movement toward and away from one another and carrying opposed engageable and disengageable contacts, a third arm mounted on said support for movement toward and away from said second arm, said second and third arms carrying opposed engageable and disengageable contacts, first adjustable means operatively connected to said third arm and effective to at least in part control its position toward and away from said second arm, second adjustable means operatively connected to said second arm and effective to at least in part control its position toward and away from said first arm, said third arm being effective, when engaged with said second arm, to move said second arm toward and away from said first arm independently of the action of said second adjustable means, temperature sensing means active on said first arm and effective to at least in part control its position toward and away from said second arm in accordance with changes in sensed temperature, and means electrically connected to said contacts and comprising first and second circuit sections adapted to be individually actuated in accordance with the relative positions of (a) said cooperating contacts on said first and second arms, and (b) said cooperating contacts on said second and third arms, respectively, said second arm being located between said first and third arms.

20. The thermostat of claim 19, in which said first arm is biased toward said second and third arms, said first adjustable means is effective within its range of adjustment to move said third arm in a given direction sequentially into engagement with said second arm and then to move said second and third arms together until said second arm engages said first arm and moves said first arm away from said temperature sensing means in said given direction, and said temperature sensing means, upon change in temperature in a given sense, moves said first arm in said given direction so as to tend to move it away from said second arm.

21. The thermostat of claim 20, in which said first, second and third arms are mounted in sequential order to define a stack and said first and second adjustable means are mounted on said support at one end of said stack, one of said adjustable means engaging only an arm at an end of said stack and the other of said adjustable means engaging only the intermediate one of said arms.

22. The thermostat of claim 19, in which said first, second and third arms are mounted in sequential order to define a stack and said first and second adjustable means are mounted on said support at one end of said stack, one of said adjustable means engaging only an arm at an end of said stack and the other of said adjustable means engaging only the intermediate one of said arms.

References Cited in the file of this patent

UNITED STATES PATENTS

| | | |
|---|---|---|
| 2,278,629 | Winning | Apr. 7, 1942 |
| 2,527,767 | Schmidt | Oct. 31, 1950 |
| 2,712,055 | Campbell | June 28, 1955 |